United States Patent [19]

Chronis

[11] 4,446,988

[45] * May 8, 1984

[54] PORTION CONTROL DRESSING AND FOOD DISPENSER

[76] Inventor: George C. Chronis, 1813 Washington NE., Albuquerque, N. Mex. 87110

[*] Notice: The portion of the term of this patent subsequent to Jun. 1, 1999 has been disclaimed.

[21] Appl. No.: 321,595

[22] Filed: Nov. 16, 1981

[51] Int. Cl.³ .................... G01F 11/02; B67D 5/46
[52] U.S. Cl. ............................. 222/63; 222/309; 222/333; 222/380
[58] Field of Search ............... 222/282, 309, 333, 287, 222/509, 380, 148, 345, 346, 561, 146 HE, 226, 234, 235, 236, 63

[56] References Cited

U.S. PATENT DOCUMENTS

| | | | |
|---|---|---|---|
| 1,570,031 | 1/1926 | Baldner | 222/333 |
| 2,532,690 | 12/1950 | Zimmerman | 222/561 |
| 2,848,019 | 8/1958 | Corbin et al. | 222/233 |
| 3,420,414 | 1/1969 | Christine et al. | 222/146 HE |
| 3,837,534 | 9/1974 | Natelson | 222/309 |
| 4,232,801 | 11/1980 | Chronis | 222/43 |

Primary Examiner—Joseph J. Rolla
Assistant Examiner—Frederick R. Handren
Attorney, Agent, or Firm—Walter R. Keller

[57] ABSTRACT

An improved dressing and food dispenser, adjustable for quantity of portion dispensed, which is driven by an electric motor, and cam operated, to apportion, then dispense.

12 Claims, 5 Drawing Figures

FIG.—4

PORTION CONTROL DRESSING AND FOOD DISPENSER

SUMMARY

This invention is designed to eliminate waste, and spillage of salad dressing, gravy and other essentially liquid or creamy type condiments and foods, yet allow passage of chunky type dressings such as blue cheese dressing or tarter sauce. It is an object of this invention to minimize waste and spillage thus enhancing sanitary conditions in public eating places such as restaurants and fast food establishments. It is further an object of this invention to provide a means of controlling the amount of condiments discharged in each operation of the invention. It is a further object of this invention that it be electrically operated thus freeing one's hands for holding food trays or plates. An additional object of this invention is that the invention be easy to assemble and dissassemble for ease of cleaning and sanitizing. Another object of the invention is to provide a means whereby the condiments are protected from dirt, dust, flying glass, flies, human contamination, and the condiments container can easily be removed and refrigerated for longer time of preserving the condiments before use.

DESCRIPTION OF PRIOR ART

1. Field of the Invention

This invention relates to dispensing apparatus; and more particularly to a device for dispensing a predetermined quantity of liquids or semi-liquid foods, soups, dressings, and condiments.

2. Description of Prior Art

This invention is an improvement over, and is directly related to CHRONIS, U.S. Pat. No. 4,232,801. CHRONIS was a complicated hand operated device. The present invention replaces complicated gearing and spring mechanisms with cams, cam followers, and an electric drive mechanism.

DESCRIPTION OF THE PREFERRED EMBODIMENT

Figure 1:
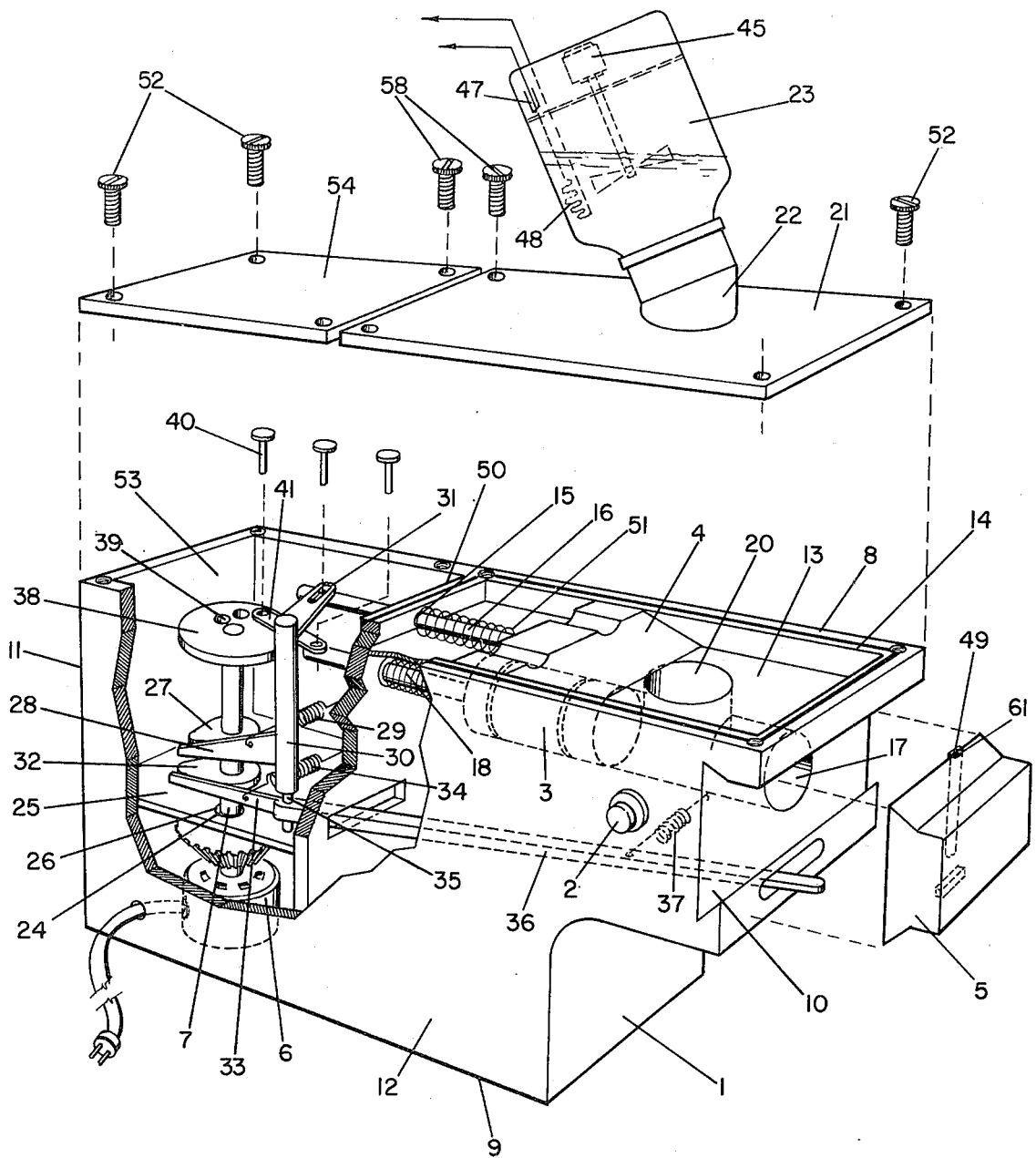
FIG. 1 is an isometric view with a cutaway of the invention.
Figure 2:
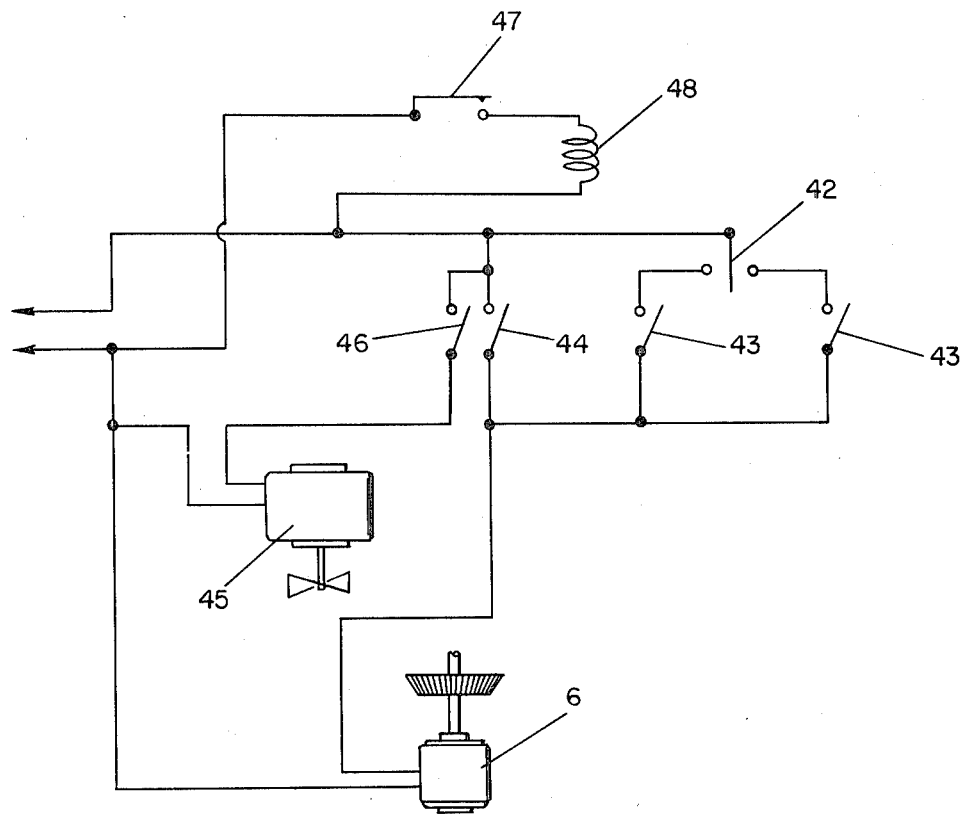
FIG. 2 is a diagram of the electrical circuitry.

As shown in FIG. 1 the invention has a chassis 1, a start button 2, piston 3, a slide valve 4, a dispensing door 5, and a motor 6 having a drive shaft 7. The chassis 1 may be made of metal or rigid plastic and may be machined from a solid block or it may be built up; however, for simplicity of description it will be described as machined from a solid block. The chassis 1 has a top 8, a bottom 9, a dispensing end 10, a butt end 11, and two sides 12. Machined into the top 8 of the chassis 1 is an essentially rectangular, shallow opening designated a valve chamber 13. The valve chamber 13 has a lip 14 which retains therein the slide valve 4, said slide valve 4 being sized in width and depth to slideably operate in the valve chamber 13. Toward the rear of the invention, the butt end 11 is hollowed out, forming a wall 50 towards the rear of the valve chamber 13. Between the wall 50 and the slide valve 4 is a cushion 51. The cushion 51, shown as a spring, may be any resilient material and shape so long as it acts as a decelerator and cushions any impact the slide valve 4 may impart to the wall 50. Through the rear of the valve chamber 13 towards the butt end 11, there is drilled a slide valve push arm hole 15. Affixed to the rear of the slide valve 4 is a round slide valve push arm 16 which passes through the slide valve push arm hole 15. The slide valve 4 is generally flat but has a beveled front edge, so that it looks and acts like a knife valve.

In the chassis 1, from the dispensing end 10 toward the butt end 11, is bored a round piston chamber 17. The piston 3 is generally cylindrical and sized to operate slideably within the piston chamber 17. Affixed to the rear of the piston 3 is a piston rod 18. A sufficiently tight seal may be achieved between the piston 3 and the piston chamber 17, usually by close machine tolerances; however the well known practice of rings or seals is obvious, and contemplated in attaining a suitable slide fit.

Figure 4:
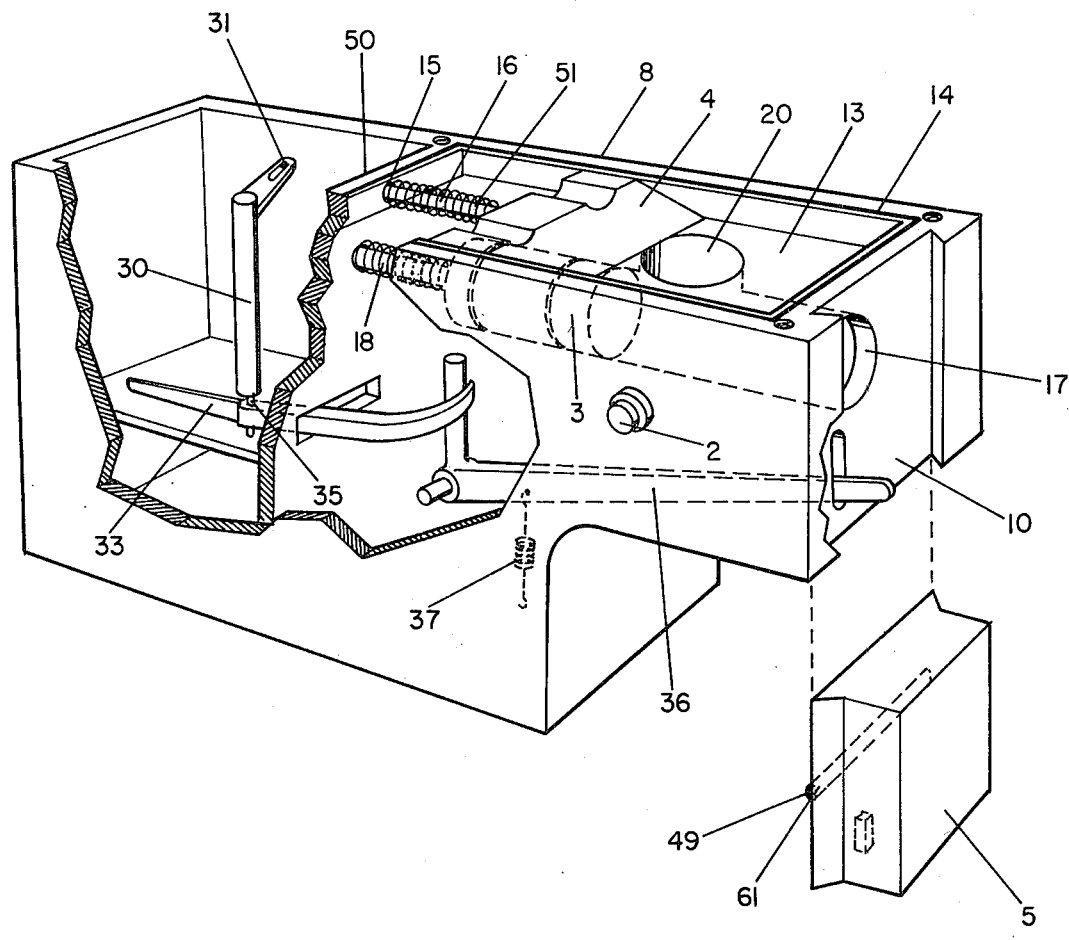
FIG. 4 is an isometric of a dispensing door which slides vertically.

The dispensing end 10 is machined to accomodate a dispensing door 5. In this description a sliding dispensing door 5 is shown, having a dove tail edge configuration, mating with the dispensing end 10. The dispensing door 5 is shown to travel horizontally, but vertical movement is obvious as shown in FIG. 4; as well as a hinged door not shown. Further, while the piston chamber 3 is shown to exit the dispensing end 10, it is also obvious that the piston chamber 3 could exit on the sides 12 or downward, as a design choice and the dispensing door 5 could be oriented to close any of the selections of orientation of the piston chamber 17.

Connecting the valve chamber 13 and the piston chamber 17 is a feed port 20. A flat top plate 21 is sized to fit and seal the valve chamber 13. A supply port 22 in the top plate 21 provides a support, seal, and access passage for condiment to the valve chamber 13. Condiment is stored in suitable containers 23, refrigerated, thermos, heated or otherwise, said containers 23 mating in any standard manner with the supply port 22. The top plate 21 may be secured to the chassis 1, as by screws 52.

Mounted in or near the bottom 9 is the motor 6. The motor 6 is shown to be an electric motor whose energy source, not shown, is any convenient suitably powered electrical outlet. Rising vertically from the motor 6 is the drive shaft 7. Mounted on the drive shaft 7, are a plurality of cams. The drive shaft 7 passes through a shaft hole 24 in a divider wall 25. The divider wall 25 and the shaft hole 24 provide a moisture seal for the electric motor 6 area by means of a shaft seal 26 mounted in the shaft hole 24 and said shaft seal 26 forming a seal on the drive shaft 7.

Rigidly mounted on the drive shaft 7 is a slide valve cam 27. A slide valve cam follower 28, which is biased against the slide valve cam 27 by means of a slide valve cam spring 29, rides against the slide valve cam 27, and the slide valve cam follower 28 is rigidly connected to vertically mounted slide valve axle 30. The slide valve cam spring 29 is connected to the slide valve cam follower 28 and to the chassis 1. The slide valve axle 30 is pivotally mounted in the chassis 1. Rigidly attached to the slide valve axle 30, near the top of the slide valve axle 30, is a slide valve actuating arm 31. The slide valve actuating arm 31 is pivotally connected to the slide valve push arm 16. Thus, the slide valve cam follower 28 imparts an oscillatory rotating motion to the slide valve axle 30, which inturn imparts an oscillatory motion to the extended slide valve actuating arm 31, and thus a reciprocating motion to the slide valve 3 causing the slide valve to alternately open then close the supply port 22.

Rigidly mounted on the drive shaft 7 adjacent to the slide valve cam 27 is a dispensing door cam 32. A dispensing door cam follower 33, which is biased against the dispensing door cam 32 by means of a dispensing door cam spring 34, rides against the dispensing door cam 32, and the dispensing door cam follower 33 is rigidly connected to a vertically mounted dispensing door axle 35. The dispensing door cam spring 34 is connected to the dispensing door cam 33 and to the chassis 1. The dispensing door axle 35 is pivotally mounted in the chassis 1. As shown, the dispensing door axle 35 is mounted coaxially with and inside of the slide valve axle 30, and the two axles 30 and 35 are separated from each other by bearings, not shown. Rigidly attached to the dispensing door axle 35, near the top of the dispensing door axle 35, is the dispensing door actuator arm 36. The dispensing door actuator arm 36 is pivotally connected to the dispensing door 5. Thus, the dispensing door cam follower 33 imparts an oscillatory rotary motion to the dispensing door axle 35, which in turn imparts an oscillatory motion to the extended dispensing door actuator arm 36, which in turn imparts a reciprocating motion to the dispensing door 5.

It has been found that because some condiments may have particles which tend to jam a sliding type door, that additional biasing of the dispensing door 5 toward its closed position is desirable. Therefore, the door biasing spring 37 is connected between the dispensing door actuator arm 36 and the chassis 1.

Rigidly mounted at the top of the drive shaft 7 is the piston drive wheel 38. The piston drive wheel 38 has a plurality of pin holes 39 which are spaced radially from near the center of the piston drive wheel 38 to near its perimeter. Pivotally mounted to the piston drive wheel 38 in the desired pin hole 39 by means of a pin 40 is a piston actuator rod 41. The other end of the piston actuator rod 41 is pivotally connected to the extremity of the piston rod 18. Thus connected, the rotary motion of the piston drive wheel 38 is converted into reciprocating motion of the piston 3. The length of the stroke of the piston 3 is determined by which of the pin holes 39 the piston actuator rod 41 is connected; and the length of the piston 3 stroke determines the volume of condiment to be dispensed each operation of the invention.

A compartment 53 formed by a divider wall 25, the wall 50, the butt end 11, and the two sides 12 contains all the cams and the upper portion of the drive shaft 7. The compartment 53 is covered with a rear deck plate 54. The rear deck plate 54 is secured to the chassis 1 as by screws 52.

The slide valve cam 27, the dispensing door cam 32, and the piston drive wheel 38 are sized, shaped and oriented on the drive shaft 7 so that the slide valve 4, the dispensing door 5 and the piston 3 are actuated sequentially.

Electrically, the invention is shown to have a non-reversible constant speed electric motor 6, which draws electrical energy from any convenient outlet. One side of the circuit is connected directly to the motor 6. The other side of the circuit is connected to an off-switch selector 42. The off-switch selector 42 is a manually positioned switch, which selects one of two off-switches 43 to be in the circuit. The circuit then continues to the selected off-switch 43. The off-switches 43 are identical to each other and both are spring spring biased switches which have cam follower actuators. The off-switches 43 are positioned at any convenient position in the system where the desired action can be obtained. The function of the off-switches 43 is to shut off power to the electric motor 6 when the piston 3 is either in the full forward position, or in the fully retracted position. Thus the off-switches 43 can be actuated by any of the cams or actuator arms. The circuit continues from the off-switches 43, to the motor 6. Across the circuit from the motor 6 to the other side from the power source is connected a start switch 44. The start switch 44 is spring loaded to the off position. When the starter switch 44 is closed the circuit is completed and the motor 6 begins to turn, and the selected cam actuated off-switch 43 is closed. While the start switch 44 may be released to the off position, the circuit remains complete until the cam operated off-switch 43 selected is opened, shutting off the invention.

In some versions of the invention, the containers 23 may have a small electric motor driven stirrer 45 therein. The stirrer 45 is electrically connected to the main circuit with a timer delay switch 46, such that the stirrer 45 will run for a short period of time, for example four seconds, before the main motor 6 is allowed to start. It is also obvious that the stirrer 45 could be driven by the main motor 6 by a pulley arrangement, not shown, to the stirrer 45.

Some condiments may need to be heated, such as gravies; and it is obvious that a heating element 48 through a thermostat 47 could be connected to the main circuit, the heating elements 48 being inside the container 23.

The off-switches 43 are actuated to shut off the invention when either the piston 3 is in the fully dispensed, forward position, or in the fully retracted position. The two modes of operation are designed for two types of condiments. Thick condiments will take a little longer to feed into the piston chamber 17, and therefore the invention is turned off by an off-switch 43 when the piston is fully retracted, thus allowing the condiment to feed into the piston chamber 17 prior to the next usage. Very little time is needed for thin less viscous condiments to feed into the piston chamber 17 and therefore the invention is shut off by the other off-switch when the piston 3 is in the full forward, having just dispensed position.

As shown, the dispensing door 5 slides horizontally. Because the condiment may collect, and soil the area around the dispensing door 5, an alternative configuration, not shown, would be an obvious extension of the configuration which is shown, to provide the capability of having the dispensing door 5 operate vertically. The design could easily be modified by having the motor 6 and drive shaft 7 as well as the connecting cams, axles, and arms operate in in an orientation perpendicular to that shown. For example, if the drive shaft 7 and the motor 6 rotated about an axis horizontal, yet perpendicular to the line of motion of the piston 3, and the slide valve axle 30 as well as the dispensing door axle 35 were also horizontally mounted, it is easy to visualize a mechanism similar to that depicted such that the slide valve 4 and the piston 3 would operate as shown, yet the dispensing door 5 would operate vertically.

Because of possible residue build up at the dispensing end 10 it is also contemplated that the dispensing door 5 would be equipped with a wiper 49, especially in the vertically sliding dispensing door 5 configuration. The wiper 49, being rubber, or rubber-like resilient material, could be slid into a groove 61 in the dispensing door 5, and it would scrape the dispensing end 10 clean.

Figure 5:
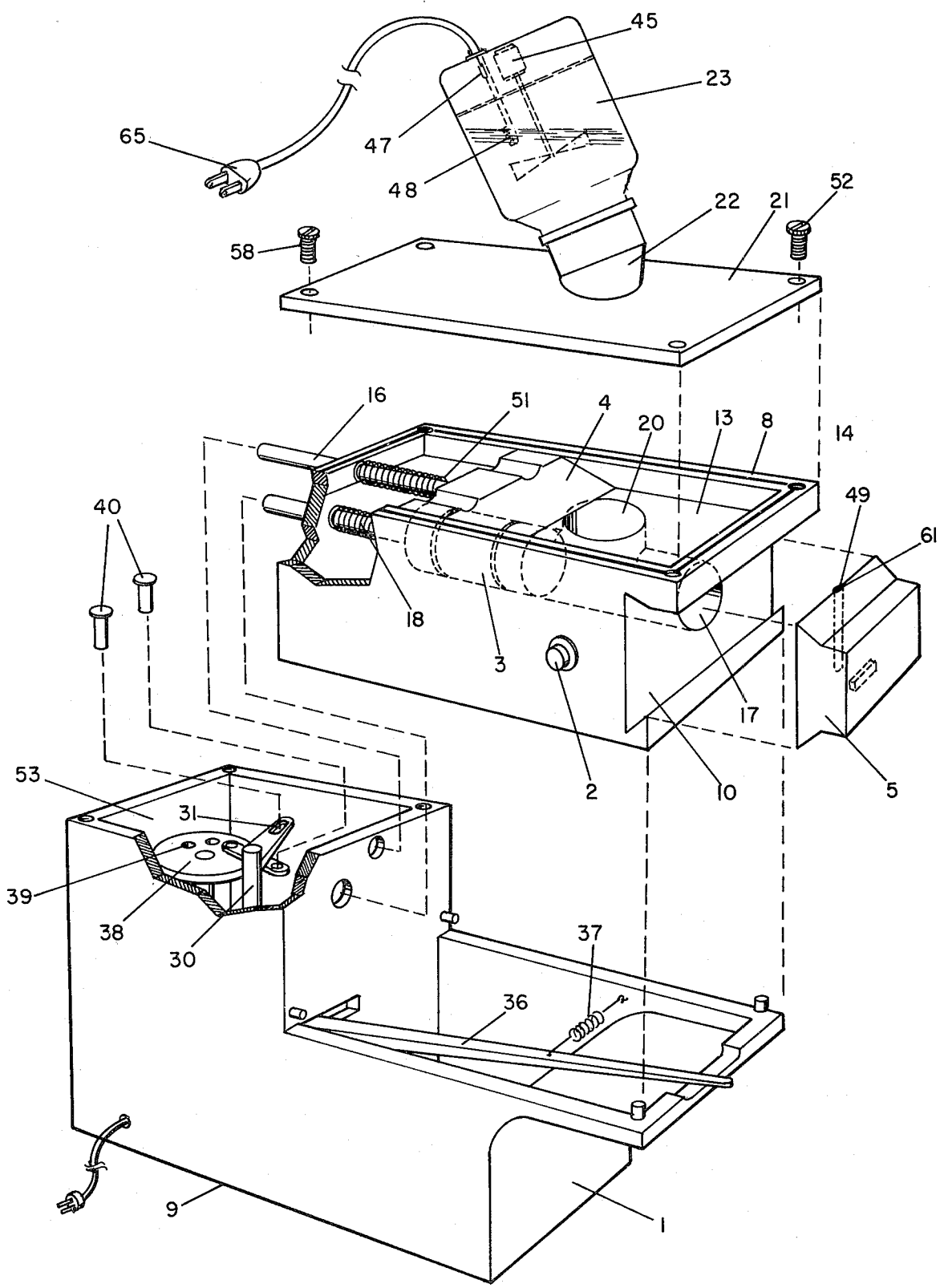
FIG. 5 is an isometric view of another embodiment of the invention.

Again it is obvious that the valve chamber 13, slide valve 4, slide valve push arm 16, and the top plate 21 could be built as a unit removeable from the chassis 1, and disconnectable from the slide valve actuating arm, as shown in FIG. 5. The whole unit then with one of the containers 23 becomes removable; and the slide valve acts as a lid for the container 23; and the decreased likelihood of spillage, along with the ease with which the whole unit could transfered for refrigeration is desirable.

Figure 3:
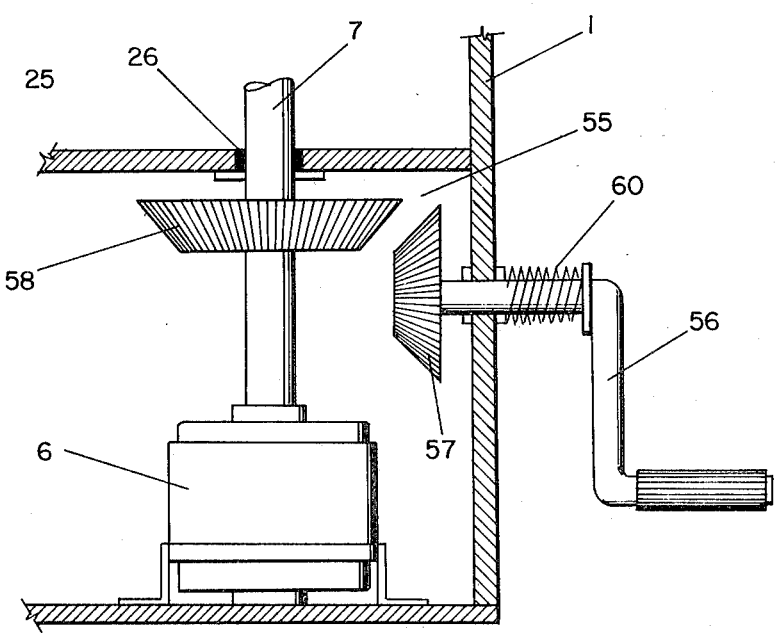
FIG. 3 is a isometric of the manual mode of operation.

A manual mode of operation for the invention may be desireable to provide the invention with the capability of being operated when there is no available electricity. This can be accomplished by means of a disengageable gearing system 55 in conjunction with a hand crank 56. The hand crank 56 extends out through the side of the chassis 1. The disengageable gearing system 55 would be such that when the hand crank 56 is used to operate the invention, the motor 6 would be turned by the drive shaft 7, and the drive shaft 7 would be turned by the hand crank 56. This feature, as depicted in FIG. 3, is an optional addition to the basic invention. However it is realized that an unlimited number of different variations will be possible and obvious to one skilled in the art. FIG. 3 shows that when the hand crank 56 is pushed towards the drive shaft 7, a bevel gear 57 mounted on the hand crank 56 engages a mating bevel gear 58 mounted on the drive shaft 7. When the hand crank 56 is turned, the invention is operated and the motor 6 is mechanically turned. When the hand crank 56 is released, the mating bevel gear 58 is disengaged from the bevel gear 57 because the hand crank 56 is biased to disengage by a crank biasing spring 60.

I claim:

1. A portion control and food dispenser device comrpising:
    a chassis having a dispensing end, a butt end, a bottom, a top, and two sides; said chassis having a valve chamber, and said chassis having a piston chamber, and said chassis having a feed port connecting the valve chamber and the piston chamber, and wherein the dispensing end of the chassis is machined to accept a sliding dispensing door; and
    a piston which slideably operates in the piston chamber; and
    a slide valve which slideably operates in the valve chamber, and which is retained in the valve chamber by a lip formed near the top of the valve chamber; and
    a sliding dispensing door which slideably mates with the dispensing end of the chassis; and
    an electric motor contained within and mounted in the chassis, said electric motor having a drive shaft; and
    a divider wall through which the drive shaft protrudes, said divider wall being within the chassis and said divider wall providing a moisture seal for the electric motor; and
    a means for converting the rotary motion of the drive shaft into actuating motions to sequentially operate the slide valve, dispensing door, and piston; and
    an electric circuit for starting, driving, and operating the invention, said electric circuit being capable of having an automatic shut off, and having the automatic shut off selectable; and
    a flat top plate having a supply port which mates with the top of the chassis covering the valve chamber and a deck cover which mates with the chassis covering the means for converting the rotary motion of the drive shaft to actuating motion; and
    a container which sealably mates with the top flat plate.

2. The device of claim 1 wherein the means for converting the rotary motion of the drive shaft into actuating motions to sequentially operate the slide valve, dispensing door and piston comprises:
    a slide valve cam rigidly mounted on the drive shaft, said slide valve cam being engaged by a slide cam follower and said slide cam follower being biased by a slide valve cam spring so that the slide valve cam follower rides against the slide valve cam; and the slide valve cam follower being rigidly connected to a slide valve axle, said slide valve axle having rigidly attached thereto a slide valve actuating arm, said slide valve actuating arm being pivotally connected to a slide valve push arm, and the slide valve push arm, which passes through a slide valve push arm hole in the rear of the valve chamber, being pivotally connected to the rear of the slide valve; and
    a dispensing door cam rigidly mounted on the drive shaft said dispensing door cam being engaged by a dispensing door cam follower, said dispensing door cam follower being biased by a dispensing door cam spring so that the dispensing door cam follower rides against the dispensing door cam; and the dispensing door cam follower being rigidly connected to a dispensing door axle, said dispensing door axle being pivotally mounted in the chassis; and a dispensing door actuator arm being rigidly attached to the said dispensing door axle, and said dispensing door actuator arm being pivotally connected to the dispensing door; and
    a piston drive wheel rigidly mounted on the top end of the drive shaft, said piston drive wheel having a plurality of pin holes spaced radially from near the center of the piston drive wheel to near the perimeter of the piston drive wheel, and a piston actuator rod on one end pivotally connected to the piston drive wheel by a pin in the desired pin hole, and said piston actuator rod being pivotally connected on its other end to a piston rod, said piston rod being pivotally connected to the rear end of the piston; and
    whereby the slide valve cam, and the dispensing door cam and the piston drive wheel are sized and shaped and oriented on the drive shaft to actuate the slide valve, the dispensing door, and the piston sequentially.

3. The device of claim 1 wherein the electric circuit for starting, driving, and stopping the device comprises an electrical power source from which one side of the electric circuit connects directly to a non-reversible constant speed electric motor; and wherein the electric circuit has another side from the electrical power source which connects to an off-switch selector, said off-switch selector then connects to two off switches, each of said off switches then connects to the electric motor; and wherein a start switch connects the electric motor to the other side of the electric circuit; and wherein the off-switch selector is a manually positioned switch which selects one of the two off switches; and wherein the start switch is biased to an off position; and wherein the two off switches are spring biased switches which have cam follower actuators; and wherein one of the off switches is positioned to be opened by the piston drive cam when the piston is fully toward the dispensing end, and wherein a second of the two off switches is positioned to be opened by the piston drive cam when the piston is fully toward the butt end.

4. The device of claim 1 wherein the dispensing door has a resilient, removeable wiper which bears on the dispensing end.

5. The device of claim 1 wherein the container contains an electric stirring means.

6. The device of claim 1 wherein the container is supplied electrical power from the electric motor circuit, and wherein the electric motor circuit has a timer delay switch which permits the stirring means to agitate for a small period of time before the electric motor begins operating.

7. The device of claim 1 wherein the dispensing door slides vertically.

8. The device of claim 1 having a manual crank and gearing means for manual operation.

9. The device of claim 1 wherein the container has an electric heating element powered from the electric motor circuit.

10. The device of claim 1 wherein the container has an electric heating element powered from a separate source.

11. The device of claim 1 wherein the container is heat insulated.

12. The device of claim 1 wherein the flat top plate, valve chamber, and slide valve are removeable as a unit from the chassis and from the means for converting rotary motion of the drive shaft to actuating motion, and wherein the flat top plate, valve chamber, and slide valve are to be stored with the container.

* * * * *